United States Patent [19]
Wolf et al.

[11] Patent Number: 6,123,621
[45] Date of Patent: Sep. 26, 2000

[54] JOINT FLOOR TRANSMITTING SHIFTING FORCES FROM A GEAR SHIFTING SYSTEM OF A TRANSMISSION TO A TRANSMISSION DRIVE MEMBER

[75] Inventors: Franz Josef Wolf, Bad Soden-Salmünster; Waldemar Hermann, Steinau; Peter Kaminski, Gelnhausen; Dieter Baum, Gründau; Alexander Korn, Bad Soden-Salmünster, all of Germany

[73] Assignee: Woco Franz-Josef Wolf & Co., Bad Soden-Salmunster, Germany

[21] Appl. No.: 08/408,600

[22] Filed: Mar. 23, 1995

[30] Foreign Application Priority Data

Mar. 23, 1994 [DE] Germany ............... 44 10 013

[51] Int. Cl.[7] ................................................ F16D 3/16
[52] U.S. Cl. ............... 464/119; 464/114; 464/117; 464/134; 464/136; 406/224
[58] Field of Search ................... 464/119, 134, 464/112, 136, 114, 117; 403/224, 54, 74

[56] References Cited

U.S. PATENT DOCUMENTS

| | | | |
|---|---|---|---|
| 2,334,039 | 11/1943 | Rueb ........................... | 464/119 |
| 3,930,381 | 1/1976 | Hall et al. ..................... | 464/136 X |
| 4,272,972 | 6/1981 | James ........................... | 464/136 X |
| 4,492,129 | 1/1985 | Hasegawa ..................... | 403/224 X |
| 4,872,361 | 10/1989 | Müller .......................... | 403/224 X |

FOREIGN PATENT DOCUMENTS

| | | | |
|---|---|---|---|
| 0 160 599 | 11/1985 | European Pat. Off. ........ | 464/119 |
| 2 515 129 | 4/1983 | France ......................... | 464/114 |
| 41 00 574 | 1/1991 | Germany . | |
| 0 474 280 | 11/1953 | Italy ............................. | 464/119 |
| 0 585 334 | 12/1977 | Russian Federation ....... | 464/119 |
| 1 259 059 | 9/1986 | Russian Federation ....... | 464/112 |
| 1 751 516 | 7/1992 | Russian Federation ....... | 464/112 |

*Primary Examiner*—Donald P. Walsh
*Assistant Examiner*—William A. Rivera
*Attorney, Agent, or Firm*—Lowe Hauptman Gopstein Gilman & Berner

[57] ABSTRACT

A joint for transmitting shifting forces from a gear-shifting system of a transmission to a transmission drive member includes a pair of joint parts (1, 2) frictionally locked to the transmission drive member and to the gear-shifting system, a coupling (3) mounted between the joint parts (1, 2) and an elastically deforming device. The elastic deforming device is a damper (4) substantially enclosing omnidirectionally the coupling (3) in such manner that when the joint is not transmitting shifting forces, the damper (4) keeps the coupling (3) spaced from the joint parts (1, 2).

10 Claims, 1 Drawing Sheet

JOINT FLOOR TRANSMITTING SHIFTING FORCES FROM A GEAR SHIFTING SYSTEM OF A TRANSMISSION TO A TRANSMISSION DRIVE MEMBER

BACKGROUND OF THE INVENTION

The present invention concerns a joint, for instance a universal joint, joining a transmission drive member and a gear-shifting system of a transmission.

In automobiles using a manual transmission, the transmission generally is either directly or indirectly integrated into the engine, or, in the case of a so-called transaxle design, is mounted apart from the engine on the motor vehicle body. In the former case, operation of the engine inevitably results in vertical or sideways vibrations, which are propagated through the transmission and the gear-shifting system to the shifting lever mounted inside the car unless there is sufficient decoupling of the vibration-susceptible parts. However, even when such decoupling is provided, vibrations arising in normal driving, particularly, vibrations generated by the torque transfer in the transmission, may nonetheless propagate acoustically on the gear-shifting lever to the vehicle inside unless adequate decoupling between the vibratory systems is assured.

An appropriate remote-controlled joint between a transmission and its gear-shifting mechanism is disclosed in German patent 41 00 574, the joint being intended for the so-called transaxle design.

However this known design has a number of drawbacks. The design is complex and hence costly, which is particularly disadvantageous when the design is incorporated into an automobile mass production line. Typically, this joint comprises two joint parts frictionally locked to each other through a complex coupling device. The device includes a coupling for transmitting the force. The coupling is held in place within a joint part by a joint pin. Mounted between the coupling and the joint pin is a tubular, elastically deforming body. Upon actuation of the gear-shift lever inside the car, the tubular body deforms and assures soft meshing of the two joint parts. Once the body is elastically deformed, frictional locking takes place when the rigid coupling engages rigid stop rings.

However, during the deformation of the elastic, tubular body, a relative motion takes place between the rigid coupling and the rigid stop rings. Intrinsically, the contact between these rigid elements will enhance the propagation of undesired vibrations. Furthermore, the relative motion between these rigid elements will result in abrasion and hence wear-causing friction.

It is thus seen that the prior art joint cannot reliably suppress the undesired propagation of vibration over an extended time of use between the vehicle transmission and the inside of this vehicle. Furthermore, because of the relative motion between rigid elements resulting in wear, the prior art joint is more susceptible to malfunction and is more expensive because of the number of components used.

Accordingly it is the object of the present invention to eliminate the cited drawbacks by creating a joint, such as a universal joint, between a transmission drive member and the gear-shifting system of a transmission which provides excellent driving comfort and is characterized by long service life and also by reliable gear-shifting.

SUMMARY OF THE INVENTION

In the present invention, a joint is provided between a transmission drive member and a gear-shifting system and comprises a pair of joint parts frictionally locked with the transmission drive member and the gear-shifting system and a coupling mounted between the joint parts. An elastically deforming device is provided comprising a damper enclosing substantially the entire coupling in such manner that, in the absence of gear-shifting forces, the coupling is maintained out of contact from the joint parts by the damper.

In other words, when the joint is unloaded, the coupling between the joint parts is kept spaced apart on all sides from the corresponding components, devices, or joint parts by the damper. The damper of the invention therefore assures excellent acoustic de-coupling and thereby prevents the propagation of undesired vibrations from the engine or the transmission into the vehicle inside.

The damper substantially encloses the coupling omnidirectionally in such manner that, in the absence of shifting forces, i.e., when the joint is in the non-shifting state, mechanical coupling between the joint parts and the coupling is achieved only through the damper which provides the already cited excellent acoustic decoupling. It must be stressed in this respect that the decoupling is assured along all three spatial axes because the coupling lacks any direct mechanical connection to any of the joint parts in the non-shifting state since the damper of the invention keeps the coupling from directly contacting the particular joint parts on all sides.

Advantageously, the coupling is a so-called cross or spider and includes two throughbores disposed mutually orthogonally and spaced apart from one another. In a further development of the invention, joint pins are received in these through-bores and in boreholes disposed in the joint parts in such manner that the spider is mounted away from and between the outside legs of the joint parts. This spaced configuration is significant because, in the absence of shifting forces, it precludes direct mechanical connection between the spider and the joint parts.

In a further development of the invention, plastic bushings are preferably mounted between the spider and the joint pin and/or between the spider and the outside legs of the joint parts in such manner that, in the absence of shifting forces, the spider is spaced by the damper from the bushings. In other words, the coupling is also prevented by the plastic bushings from directly resting against the joint parts, thereby precluding a direct mechanical connection between the typically metallic joint parts and the universal joint that would otherwise propagate vibrations.

In another preferred embodiment, the damper of the invention is mounted and substantially encloses the coupling omnidirectionally to preclude direct mechanical connection even between the vibration-suppressing plastic bushings and the coupling. Thus, when there is shifting, that is, when the coupling would be expected to rest against the plastic bushings, the plastic bushings are still acoustically decoupled from the coupling because the damper enclosing the coupling inserts a damping layer between the coupling and the plastic bushings.

Additionally, reliable mechanical force transmission between the joint parts is provided by the coupling, because the spacing created by the damper between the coupling and the joint parts when the shifting lever is actuated can be overcome on account of the elastic deformability of the damper in such manner that the shifting force is reliably transmitted. It is easily seen that damping is preserved during shifting by virtue of the damper omnidirectionally enclosing the coupling.

In yet another preferred embodiment of the invention, the damper comprises sealing lips at its outside surfaces resting against the joint parts to completely and hermetically seal the inside space of the joint relative to the outside. Thus, foreign bodies such as dust or dirt are prevented from entering the inside of the joint and accordingly the joint will evince an exceedingly long life. These sealing lips may engage from behind the bushings mounted between the spider and the joint parts. To achieve this, a circumferential annular channel is provided in the bushing between the bushing and the joint parts for receiving the sealing lips. Thus, the coupling is completely enclosed by the damper and thereby the joint inside is completely secured against soil penetration.

The damper of the invention is preferably made of a rubber substance; however, any appropriate elastomer also may be used. If the damper is made of rubber, then this rubber is advantageously applied by dipping the preferably metallic coupling into a rubber bath, and thereafter vulcanizing the rubber.

It is clear therefore that the joint of the invention provides excellent acoustic decoupling in all three directions. Additionally, abrasion of the joint components is avoided since the inside of the joint is sealed, thereby precluding penetration of dust or soil into the gap between the plastic bushings and the spider. Furthermore, the acoustic decoupling of vibrations in all three coordinates is adjustable solely by means of the damper of the invention. Finally, it is to be appreciated that the joint of the invention is applicable to many different kinds of motor vehicles.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
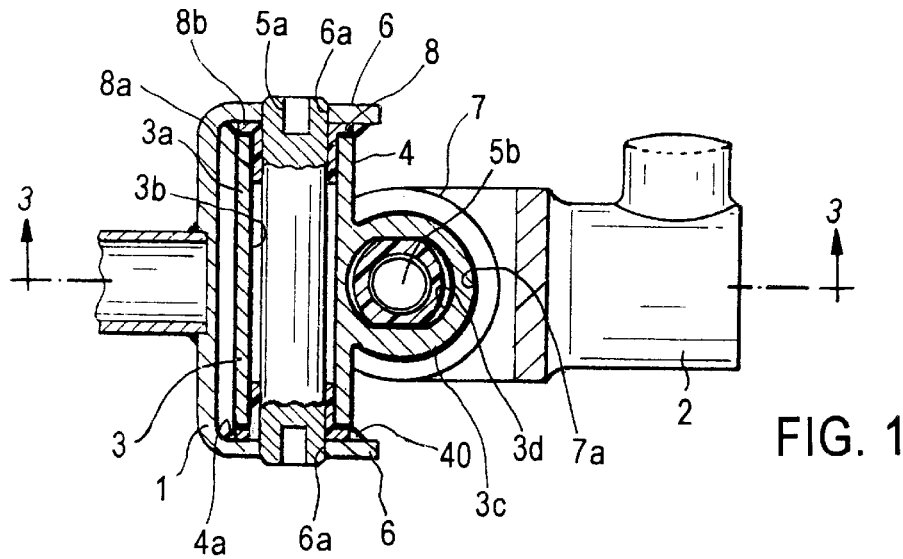
FIG. 1 is a side view, partially in cross-section, of the joint, for instance a universal joint, of the present invention, shown in the absence of shifting force.
Figure 2:
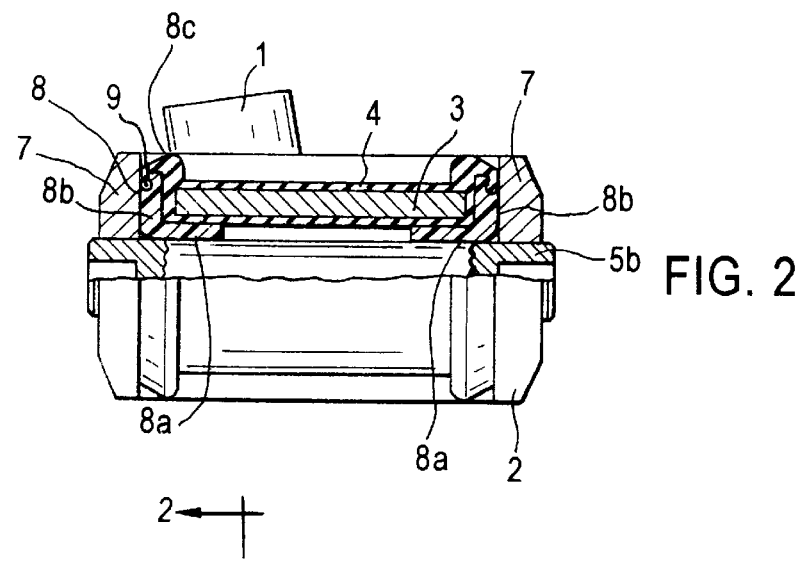
FIG. 2 is a cross-sectional view taken along line 2—2 of FIG. 3, rotated 90° in the clockwise direction.
Figure 3:
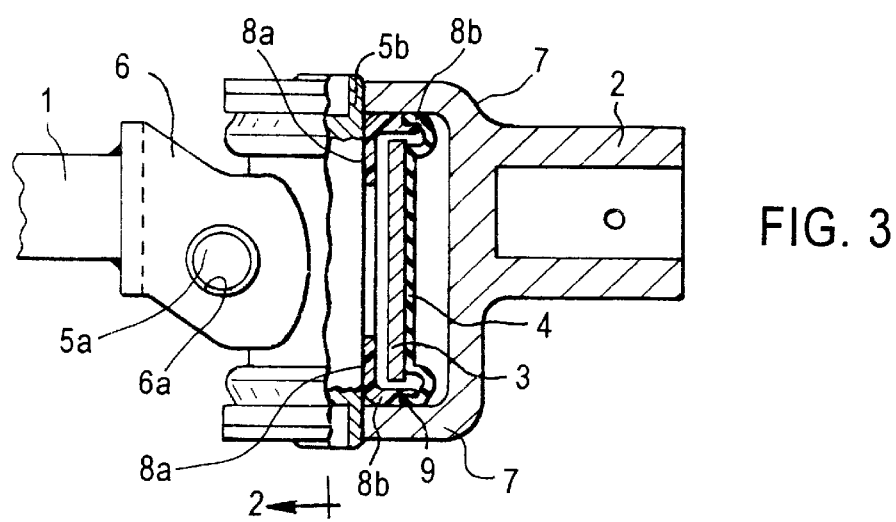
FIG. 3 is a cross-sectional view taken along line 3—3 of FIG. 1.

As shown by FIGS. 1 through 3 of the drawing, the joint of the preferred embodiment mode comprises a U-shaped joint part 1 and, as shown by FIG. 3, an opposite and also U-shaped joint part 2. Joint part 1 is frictionally connected to a transmission drive member, the detail of which is omitted for clarity. Joint part 2 is connected, for instance, with a gear-shift system (again, not shown for clarity). A coupling, preferably a spider 3 as shown in the drawings, is mounted between the two joint parts 1, 2.

Spider 3 is enclosed by an elastically deforming damper 4. Damper 4 encloses the spider 3 omnidirectionally, i.e., on all sides, and extends beyond the ends of spider 3, as shown, for example, by 4a in FIG. 1. In the absence of shifting force, as shown in the drawings, the spider 3 is removed from the joint parts 1, 2 by the damper 4. This means that when the joint does not transmit shifting forces, the spider 3 does not contact but remains spaced from the joint parts 1, 2 by the damper.

More specifically, U-shaped joint part 1 includes a pair of legs 6, each having a slotted borehole 6a disposed therein. Likewise U-shaped joint part 2 includes a pair of legs 7, each having a slotted borehole 7a disposed therein. Spider 3 includes a first section 3a and a second section 3c disposed mutually orthogonally from first section 3a. Disposed in first section 3a is a first through borehole 3b aligned with boreholes 6a of legs 6. Similarly, disposed in second section 3c is a second through borehole 3d aligned with boreholes 7a of legs 7. The joint of the present invention further comprises a first joint pin 5a passing through borehole 3b in the spider 3 and extending into boreholes 6a in the legs 6; and a second joint pin 5b passing through borehole 3d in the spider 3 and extending into boreholes 7a in the legs 7.

In the preferred embodiment shown in the drawings, a plurality of plastic bushings 8 is mounted between joint pins 5a, 5b and spider 3 and between spider 3 and legs 6, 7 of joint parts 1, 2. More specifically, as seen in FIG. 1, bushing 8 has a L-shaped cross-section including a first axial flange 8a and a second, perpendicular radial flange 8b. As shown in FIG. 1, axial flange 8a is received between joint pin 5a and the inner surface of throughhole 3b, and radial flange 8b is disposed between the end surface of first section 3a and joint leg 6. Thus, it is seen that bushing 8 extends axially in the longitudinal direction relative to joint pin 5a over a portion of the shaft of the pins. Bushing 8 further extends radially outwardly between the spider 3 and the leg 6. Similar bushings are provided at the opposing end of joint pin 5a and at both ends of joint pin 5b.

It is easily noted from FIGS. 2 and 3 that a spacing is present between the bushing 8 and the spider 3, whereby propagation of vibration between the joint part 1 and the joint part 2 through the spider 3 and hence into the vehicle inside is reliably prevented when the universal joint is not transmitting shifting forces.

As shown in particular by FIGS. 2 and 3, in order to seal the joint from the outside, the damper 4 comprises sealing lips 9 in the exterior region of the damper. Specifically, bushing radial flange 8b includes a circumferential annular channel 8c. Received in channel 8c is a portion of the sealing lips 9. Thus, the entire inside of the joint is protected against penetration of external soil or water and it can be appreciated that the joint offers an unusually long life and the additional advantage of being easily assembled from a few components.

When shifting gears, the joint part 2 is axially displaced along its longitudinal direction. Because the joint part 2 is allowed some longitudinal movement relative to spider 3, by virtue of slotted borehole 7a, joint part 2 will pass through the space between the joint pin 5b and the spider 3. Once joint part 2 passes through this space, joint pin 5b frictionally locks with the spider 3 and the shifting force can be transmitted to the joint part 1 and, consequently, to the transmission drive member.

It is to be appreciated that although frictional locking occurs, the damper 4 still provides some degree of damping by virtue of the fact that a portion of the damper is disposed between the force-transmitting components of the joint parts 1, 2 and the spider, so that propagation of undesired vibrations is averted even during shifting.

Although the present invention has been described and illustrated in detail, it is clearly understood that the same is by way of illustration and example only and is not to be taken by way of limitation, the spirit and scope of the present being limited only by the terms of the appended claims.

What is claimed is:

1. A joint for transmitting shifting forces from a gear-shifting system of a transmission to a transmission drive member, the joint comprising:

a first joint part (1) frictionally connected to the transmission drive member;

a second joint part (2) connected to the gear-shifting system;

a coupling (3) mounted between the first and second joint parts (1, 2); and an elastically deforming device comprising a one-piece elastically deforming damper (4) substantially enclosing the coupling (3) and keeping the coupling spaced apart from the first and second joint parts in the absence of the shifting forces, wherein the coupling (3) is a spider comprising two substantially mutually orthogonal and spaced-apart sections (3*a*, 3*c*) and a borehole (3*b*, 3*d*) disposed in each section, wherein each of the first and second joint parts (1, 2) includes a borehole (6*a*, 7*a*), the joint further comprising a pair of joint pins (5*a*, 5*b*) passing through one of the spider boreholes (3*b*, 3*d*) and one of the first and second joint part boreholes (6*a*, 7*a*), the first and second joint part boreholes (6*a*, 7*a*) being disposed relative to the spider boreholes (3*b*, 3*d*) so that the spider (3) is mounted spaced from outside walls of the first and second joint parts (1, 2), further comprising bushings (8) mounted between the spider (3) and the joint pin (5), wherein the damper (4) keeps the spider (3) at a spacing from the bushings (8) when the joint is not transmitting the shifting forces.

2. A joint according to claim 1, wherein the bushings are mounted between the spider (3) and the outside walls of the first and second joint parts (1,2).

3. A joint according to claim 2, wherein the damper (4) comprises sealing lips (9) resting against the first and second joint parts (1, 2) for sealing the joint.

4. A joint according to claim 3, wherein the sealing lips (9) engage a surface of the bushings (8) disposed between the spider (3) and the first and second joint parts (1, 2).

5. A joint according to claim 4, wherein the surface is underneath the bushings (8).

6. A joint according to claim 3, wherein the bushing (8) includes an annular, circumferential channel for receiving the sealing lip.

7. A joint according to claim 1, wherein the damper is made of a rubber material.

8. The joint according to claim 1, wherein, when shifting gears, the second joint part (2) is axially displaced along its longitudinal direction.

9. The joint according to claim 8, wherein the second joint part (2) is operable to move longitudinally relative to the spider (3) by virtue of a slotted borehole (7*a*) in the second joint part, so that said second joint part (2) will pass through a space between a joint pin (5*b*) and said spider (3).

10. The joint according to claim 9, wherein, once the second joint part (2) passes through said space, the joint pin (5*b*) frictionally locks with the spider (3) and the shifting force can be transmitted to the first joint part (1) and consequently, to the transmission drive member.

\* \* \* \* \*